(12) United States Patent
Xie et al.

(10) Patent No.: US 6,606,393 B1
(45) Date of Patent: Aug. 12, 2003

(54) MESSAGE AUTHENTICATION CODE USING IMAGE HISTOGRAMS

(75) Inventors: Liehua Xie, Newark, DE (US); Arianne M. Lewis, Chestnut Hill, MA (US); Evert Basch, Stow, MA (US); Gonzalo Arce, Wilmington, DE (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

(21) Appl. No.: 09/453,145

(22) Filed: Dec. 2, 1999

(51) Int. Cl.[7] ................................................ G06K 9/00
(52) U.S. Cl. ......................... 382/100; 382/168; 380/210
(58) Field of Search ................................. 382/100, 232, 382/168–172; 380/51, 54, 210, 252, 287; 713/176; 348/461

(56) References Cited

U.S. PATENT DOCUMENTS

| | | | | | |
|---|---|---|---|---|---|
| 4,547,882 | A | * | 10/1985 | Tanner ........................ | 714/755 |
| 5,515,388 | A | * | 5/1996 | Yagasaki ..................... | 714/800 |
| 5,778,102 | A | * | 7/1998 | Sandford et al. ........... | 382/251 |
| 5,875,249 | A | * | 2/1999 | Mintzer et al. .............. | 380/54 |
| 5,960,081 | A | * | 9/1999 | Vynne et al. ................ | 713/176 |
| 6,065,119 | A | * | 5/2000 | Sandford et al. ........... | 713/200 |
| 6,154,571 | A | * | 11/2000 | Cox et al. .................... | 382/250 |
| 6,175,650 | B1 | * | 1/2001 | Sindhu et al. ............... | 382/171 |
| 6,285,775 | B1 | * | 9/2001 | Wu et al. ..................... | 382/100 |
| 6,434,719 | B1 | * | 8/2002 | Livingston .................. | 714/804 |

OTHER PUBLICATIONS

Friedman, Gary L. "The Trustworthy Digital Camera: Restoring Credibility to the Photographic Image." IEEE, pp. 905–910, 1993.*

Graveman et al., "Approximate Message Authentication Codes," Proceedings, Third Annual Federated Laboratory Symposium on Advanced Telecommunications/Information Distribution Research Program (ATIRP), (1999) pp. 411–415.

J. Russ, "Image Enhancement," The Image Processing Handbook, 2nd Edition, pp. 216–224.

J. Lim, "Contrast and Dynamic Range Modification," Two–Dimensional Signal and Image Processing, Prentice Hall, pp. 453–459.

Haskell et al., "Video Basics," Digital Video: An Introduction to MPEG–2, pp. 92–95.

Liehua Xie et al., "Secure MPEG Video Communication by Watermarking," Abstract, Department of Electrical and Computer Engineering, University of Delaware, pp. 459–463.

* cited by examiner

Primary Examiner—Bhavesh M. Mehta
Assistant Examiner—Aaron Carter
(74) Attorney, Agent, or Firm—Leonard Charles Suchyta; James K. Weixel

(57) ABSTRACT

According to the principles of the invention, there is provided a system for generating a message authentication code for a conventional digital video stream. The system operates on the rows and columns of block data for a video stream, and more specifically on histograms of DC coefficients from each row and column, to produce a compact code that is nonetheless descriptive of the underlying images in the video stream. The message authentication code can be reproduced from the images of a received video stream, and if desired, compared with a digital watermark embedded in the video stream in order to confirm the accuracy of the video content or identify the source of the video stream.

46 Claims, 11 Drawing Sheets

MESSAGE AUTHENTICATION CODE USING IMAGE HISTOGRAMS

STATEMENT REGARDING FEDERALLY SPONSORED RESEARCH OR DEVELOPMENT

This invention was made with Government support under Contract No. DAAL-01-96-2-0002, awarded by the U.S. Army Research Laboratory. The Government has certain rights in this invention.

BACKGROUND OF THE INVENTION

1. Field of the Invention

This application relates to the field of digital multimedia and more particularly to the field of watermarking digital video content.

2. Description of Related Art

The secure transmission of digital multimedia information is an important concern for multimedia content owners, particularly in distribution channels having public access, such as the Internet or wireless networks. Security has traditionally been provided through encryption, however, a widespread distribution of key-management for encryption is cumbersome. Furthermore, encryption provides incomplete security since, after decryption, the original digital content may be readily reproduced and distributed.

Another form of protection is provided by a message authentication code ("MAC") that is attached to digital content. For example, origination information can appear within a message field appended to digital content. However, this type of add-on authentication is easily identified and removed. A more resilient MAC system is provided by digital watermarking. Digital watermarking is a technique for hiding an identification of origin in a digital media stream. A watermark is actually embedded in the media stream, so that removal of the watermark may destroy or visibly alter the underlying content. The watermark may also be inserted into the original data in a manner that is imperceptible to the listener/viewer. When such watermarked digital content is distributed on-line, or recorded on a disk, the origination data travels with it, and allows the originator to demonstrate the source of the content. Digital watermarking also identifies tampering, since any manipulation of a sequence will result in an invalid watermark.

The difficulty in defining a watermark for tamper-proofing and authentication of video lies in adequately describing every frame of the video sequence within the capacity allocated for the watermark sequence, since the length of the watermark must be reconciled with the competing objective that the watermark be unobtrusive. One known approach to this difficulty uses edge mapping. In edge mapping, high-contrast areas in the luminance component are converted to a binary edge map for each Moving Picture Experts Group ("MPEG") frame. In order to compress this representation into a form sufficiently compact for watermarking, another binary edge map is generated by a logical OR of individual edge maps from a group of consecutive pictures. This representation is then encrypted for security. As a significant disadvantage, this approach has not proven highly reliable, particularly in high-motion video sequences. Other approaches directed at a compact, unique watermark representations of the underlying content also exist. However, they tend to perform poorly under the lossy environment of video compression techniques such as MPEG.

There remains a need for a message authentication code that compactly describes digital video content in a manner that permits tamper-proofing and authentication of origin. There also remains a need for a message authentication code that permits identification of particular areas within an image that have been tampered with.

SUMMARY OF THE INVENTION

According to the principles of the invention, there is provided a system for generating a message authentication code for a conventional digital video stream. The system operates on the rows and columns of block data for a video stream, and more specifically on histograms of DC coefficients from each row and column, to produce a compact code that is nonetheless descriptive of the underlying images in the video stream. The message authentication code can be reproduced from the images of a received video stream, and if desired, compared with a digital watermark embedded in the video stream in order to confirm the accuracy of the video content or identify the source of the video stream.

In one aspect, a method of generating a message authentication code according to the principles of the invention includes receiving a plurality of blocks of image data, each block corresponding to a particular one of a plurality of rows and a particular one of a plurality of columns of an image; generating a row histogram for each particular one of the plurality of rows, the row histogram representing values in blocks corresponding to the particular one of the plurality of rows; generating a row representation from each row histogram, the row representation corresponding to the particular one of the rows from which the row histogram was formed; generating a column histogram for each particular one of the plurality of columns, the column histogram representing values in blocks corresponding to the particular one of the plurality of columns; generating a column representation from each column histogram, the column representation corresponding to the particular one of the columns from which the column histogram was formed; and generating a message authentication code comprising the plurality of row representations and the plurality of column representations.

In this aspect, the method may further include encrypting the message authentication code. The method may include an error correction code with the message authentication code. Each row histogram may represent a plurality of DC coefficient values in blocks corresponding to the particular one of the plurality of rows, and each column histogram may represent a plurality of DC coefficient values in blocks corresponding to the particular one of the plurality of columns. Each row histogram may represent a plurality of block average values in blocks corresponding to the particular one of the plurality of rows, and each column histogram may represent a plurality of block average values in blocks corresponding to the particular one of the plurality of columns. Each row histogram may include eight evenly spaced, contiguous bins, and each column histogram may include eight evenly spaced, contiguous bins.

Each row representation may be a row parity bit and each column representation may be a column parity bit. In this aspect, generating the row parity bit may further include forming a row digital sequence from the row histogram, the row digital sequence including a row bin bit for each bin of the row histogram, and generating the row parity bit by summing the row bin bits of the digital sequence; and generating the column parity bit may further include forming a column digital sequence from the column histogram, the column digital sequence including a column bin bit for each bin of the column histogram, and generating the column parity bit by summing the column bin bits of the column digital sequence. Generating the message authentication code may include concatenating each of the row parity bits and each of the column parity bits. The message authentication code may be a one-hundred fifty bit message authentication code. The plurality of blocks of image data may comprise a Moving Picture Experts Group video stream.

In a different aspect, a method of using a message authentication code according to the principles of the invention includes: receiving a plurality of blocks of image data, each block corresponding to a particular one of a plurality of rows and a particular one of a plurality of columns of an image; generating a row histogram for each particular one of the plurality of rows, the row histogram representing values in blocks corresponding to the particular one of the plurality of rows; generating a row representation from each row histogram, the row representation corresponding to the particular one of the rows from which the row histogram was formed; generating a column histogram for each particular one of the plurality of columns, the column histogram representing values in blocks corresponding to the particular one of the plurality of columns; generating a column representation from each column histogram, the column representation corresponding to the particular one of the columns from which the column histogram was formed; generating a message authentication code comprising the plurality of row representations and the plurality of column representations; reading a watermark from the plurality of blocks of image data; and comparing the watermark to the message authentication code.

In this aspect, the method may further include decrypting the watermark before comparing it to the message authentication code. Each row histogram may represent a plurality of DC coefficient values in blocks corresponding to the particular one of the plurality of rows, and each column histogram may represent a plurality of DC coefficient values in blocks corresponding to the particular one of the plurality of columns. Each row histogram may represents a plurality of block average values in blocks corresponding to the particular one of the plurality of rows, and each column histogram may represent a plurality of block average values in blocks corresponding to the particular one of the plurality of columns. Each row histogram may include eight evenly spaced, contiguous bins, and each column histogram may include eight evenly spaced, contiguous bins.

Further in this aspect, each row representation may be a row parity bit and each column representation may be a column parity bit. Generating the row parity bit may further include forming a row digital sequence from the row histogram, the row digital sequence including a row bin bit for each bin of the row histogram, and generating the row parity bit by summing the row bin bits of the digital sequence; and generating the column parity bit may further include forming a column digital sequence from the column histogram, the column digital sequence including a column bin bit for each bin of the column histogram, and generating the column parity bit by summing the column bin bits of the column digital sequence. Generating the message authentication code may include concatenating each of the row parity bits and each of the column, parity bits. The message authentication code may be a one-hundred fifty bit message authentication code. The plurality of blocks of image data may be a Moving Picture Experts Group video stream. Comparing the watermark to the message authentication code may further include localizing errors in the plurality of blocks of image data.

In a different aspect, a system for generating a message authentication code according to the principles of the invention includes: means for receiving a plurality of blocks of image data, each block corresponding to a particular one of a plurality of rows and a particular one of a plurality of columns of an image; means for generating a row histogram for each particular one of the plurality of rows, the row histogram representing values in blocks corresponding to the particular one of the plurality of rows; means for generating a row representation from each row histogram, the row representation corresponding to the particular one of the rows from which the row histogram was formed; means for generating a column histogram for each particular one of the plurality of columns, the column histogram representing values in blocks corresponding to the particular one of the plurality of columns; means for generating a column representation from each column histogram, the column representation corresponding to the particular one of the columns from which the column histogram was formed; and means for generating a message authentication code comprising the plurality of row representations and the plurality of column representations.

In this aspect, each row presentation may be a row parity bit and each column representation may be a column parity bit. The system may further include means for encrypting the message authentication code. The system may further include means for including error correction with the message authentication code. The system may further include a Moving Picture Experts Group encoder for providing the plurality of blocks of image data to the receiving means; and a watermark unit for embedding the message authentication code in the plurality of blocks of image data. The system may further include a Moving Picture Experts Group decoder for providing the plurality of blocks of image data to the receiving means; a watermark reader for reading a watermark embedded in the plurality of blocks of image data; and a watermark processor for comparing the watermark to the message authentication code.

In a different aspect, a digital video encoder according to the principles of the invention includes: a transform unit, the transform unit receiving a plurality of blocks of video data and performing a two-dimensional transform on each block to provide a transformed block, each transformed block including a plurality of coefficients; a quantizer, the quantizer receiving each transformed block and scaling each coefficient of each transformed block using a quantization index, thereby providing a plurality of quantized blocks; a message authentication code generator, the message authentication code generator receiving each of the plurality of quantized blocks and generating a message authentication code, the message authentication code including a plurality of row parity bits and a plurality of column parity bits, each one of the plurality of row parity bits determined according to a parity of a sum of corresponding row histogram bins containing DC coefficients, and each one of the column parity bits determined according to a parity of a sum of corresponding column histogram bins containing DC coefficients; and a watermark unit, the watermark unit receiving the message authentication code and the plurality of quantized blocks, and the watermark unit embedding the message authentication code into the plurality of quantized blocks.

In this aspect, the message authentication code generator may encrypt the message authentication code. Each row histogram may include eight evenly spaced, contiguous bins, and each column histogram may include eight evenly spaced, contiguous bins. The message authentication code may include a concatenation of each of the plurality of row parity bits and each of the plurality of column parity bits. The message authentication code may be a one-hundred fifty bit message authentication code. The plurality of blocks of video data may be a Moving Picture Experts Group video stream.

In a different aspect, a message authentication code embodied in a Moving Picture Experts Group video data carrier signal, according to the principles of the invention, includes: a plurality of row parity bits, one row parity bit for each row of transformed blocks of an image, each one of the row parity bits determined according to a parity of a sum of corresponding row histogram bins containing DC coefficients; and a plurality of column parity bits, one column parity bit for each column of transformed blocks of the image, each one of the column parity bits determined according to a parity of a sum of corresponding column histogram bins containing DC coefficients.

In this aspect, the plurality of row parity bits may include sixty row parity bits and the plurality of column parity bits may include ninety column parity bits. The plurality of column parity bits and the plurality of row parity bits may be encrypted.

In a different aspect, a computer program product for generating a message authentication code according to the principles of the invention includes machine executable code for performing the following steps: receiving a plurality of blocks of image data, each block corresponding to a particular one of a plurality of rows and a particular one of a plurality of columns of an image; generating a row histogram for each particular one of the plurality of rows, the row histogram representing values in blocks corresponding to the particular one of the plurality of rows; generating a row representation from each row histogram, the row representation corresponding to the particular one of the rows from which the row histogram was formed; generating a column histogram for each particular one of the plurality of columns, the column histogram representing values in blocks corresponding to the particular one of the plurality of columns; generating a column representation from each column histogram, the column representation corresponding to the particular one of the columns from which the column histogram was formed; and generating a message authentication code comprising the plurality of row representations and the plurality of column representations.

In this aspect, the computer program product may further include machine executable code for encrypting the message authentication code. Each row histogram may represent a plurality of DC coefficient values in blocks corresponding to the particular one of the plurality of rows, and each column histogram may represent a plurality of DC coefficient values in blocks corresponding to the particular one of the plurality of columns. Each row histogram may represent a plurality of block average values in blocks corresponding to the particular one of the plurality of rows, and each column histogram may represent a plurality of block average values in blocks corresponding to the particular one of the plurality of columns. Each row histogram may include eight evenly spaced, contiguous bins, and each column histogram may include eight evenly spaced, contiguous bins.

Generating the row representation may further include forming a row digital sequence from the row histogram, the row digital sequence including a row bin bit for each bin of the row histogram, and generating a row parity bit by summing the row bin bits of the digital sequence; and generating the column representation may further include forming a column digital sequence from the column histogram, the column digital sequence including a column bin bit for each bin of the column histogram, and generating a column parity bit by summing the column bin bits of the column digital sequence. Generating the message authentication code may include concatenating each of the row representations and each of the column representations. The message authentication code may be a one-hundred fifty bit message authentication code. The plurality of blocks of image data may be a Moving Picture Experts Group video stream.

BRIEF DESCRIPTION OF DRAWINGS

The foregoing and other objects and advantages of the invention will be appreciated more fully from the following further description thereof, with reference to the accompanying drawings, wherein.

DETAILED DESCRIPTION OF THE PREFERRED EMBODIMENT(S)

To provide an overall understanding of the invention, certain illustrative embodiments will now be described, including a system and method for generating a histogram message authentication code from an MPEG-2 video stream. However, it will be understood by those of ordinary skill in the art that the methods and systems described herein can be suitably adapted to any system for coding digital multimedia including digital versatile disk, compact disk video, personal computer video, streaming Internet video, digital cable television, and digital satellite television. As used herein, the term "multimedia" refers to any medium or combination of media, such as still video, motion video, audio, and the like. The methods and systems described herein are particularly applicable to those coding schemes based on frequency-transformed image data including MPEG-1, MPEG-2, MPEG-4, and known teleconferencing standards. As used herein, the term "MPEG" is specifically intended to refer to the MPEG-2 video standard, as well as the MPEG-1 and MPEG-4 standards. Further, as used herein, the term "watermark" refers to any digital sequence embedded into a digital media stream, and the term "message authentication code" refers to a particular digital sequence indicative of digital media origin, such as the histogram watermark. A message authentication code may be embedded into a digital media stream as a watermark.

Figure 1:
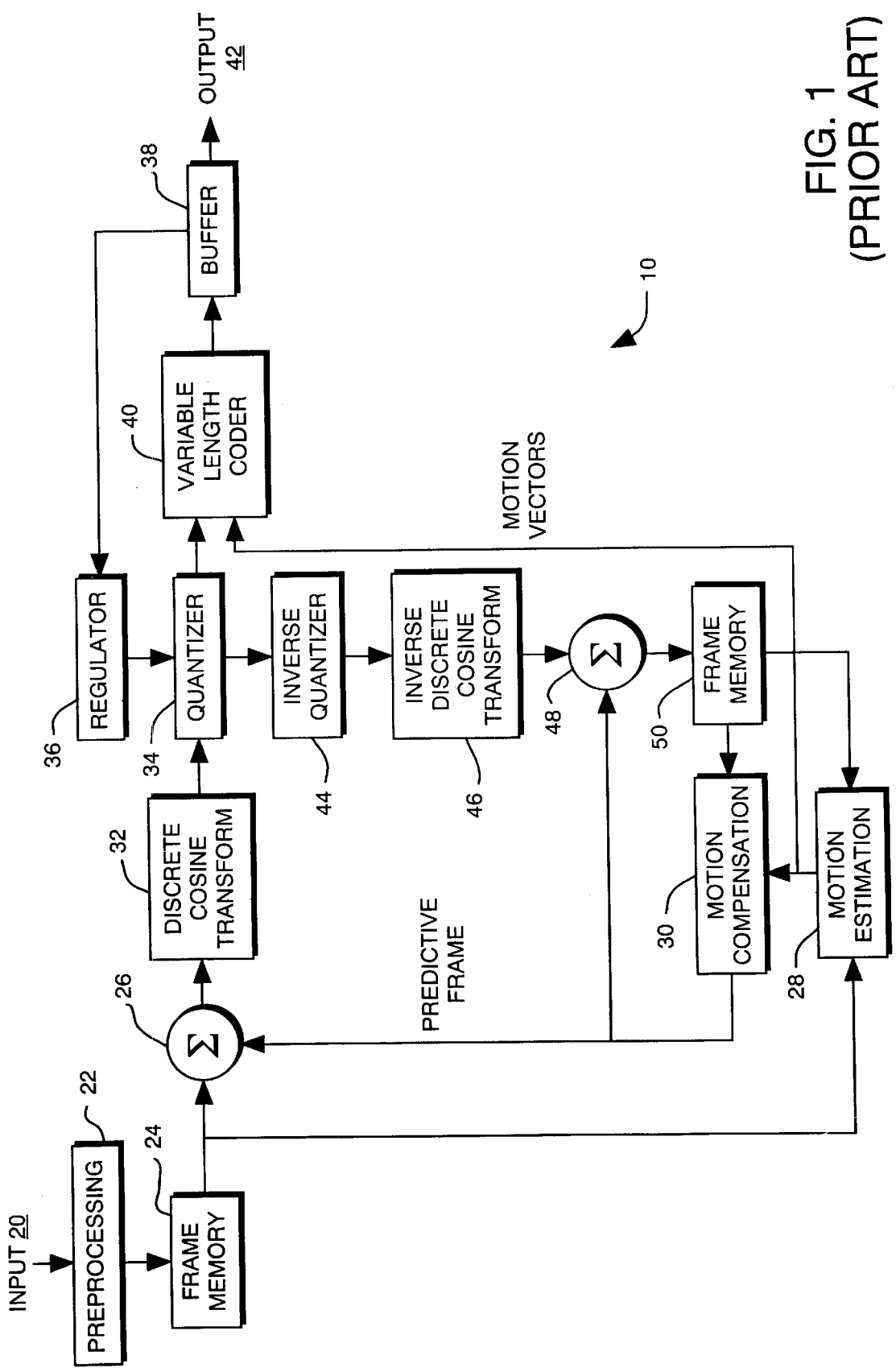
FIG. 1 is a block diagram of a prior art MPEG encoder.

FIG. 1 shows a prior art MPEG encoder 10 in block diagram form. A video input 20 is received by a pre-processing unit 22. The pre-processing unit 22 performs functions required to convert the video input 20 into a form amenable to MPEG encoding. In particular, the pre-processing unit digitizes the video input 20 with an analog/digital converter (if the input 20 is analog) and divides the digitized video into sixteen-by-sixteen pixel squares, or "blocks." The pre-processing unit 22 then converts each digitized block into a luminance-chrominance representation such as YCbCr. A block encoded using a conventional 4:2:0 format for luminance-chrominance has four luminance blocks ($Y_1$–$Y_4$) and two chrominance blocks ($C_b$, $C_r$). Other formats, such as 4:2:2, may also be used. Some sources for video input 20 will already be in a suitable YCbCr format.

Pre-processed blocks are stored in a first frame memory 24 where they may be sequentially fed to a first pixel-by-pixel summing junction 26. The blocks are also fed to a motion estimation unit 28 for comparison to reconstructed previous images. The summing junction 26 receives predictive or differential image data from a motion compensation unit 30. Here, MPEG compression is improved by allowing the system to operate on a difference image between a current image and an earlier image. A difference image (the complete current image, when encoding an I frame) is provided from the summing junction 26 to a discrete cosine transform ("DCT") unit 32, which performs a two-dimensional DCT on the difference image to provide a transformed block. While the MPEG standard specifies a particular DCT, it will be appreciated that other types of DCT and other transforms are known and may be usefully employed in accordance with the teachings herein.

The transformed block is provided from the DCT unit 32 to a quantizer 34 where each block is quantized using an eight-by-eight quantization index to provide a quantized block. Using this technique, each value in the transformed block is scaled by a corresponding value in the quantization index, thus allowing independent scaling for each spatial frequency in the quantized block. The quantization index may vary depending on whether a block is an I, P, or B block. A regulator 36 monitors a buffer 38 to prevent overflow of the capacity of the buffer 38. In order to prevent overflow, the regulator 36 may modify the quantization index to achieve greater data compression in the quantizer 34 (at the expense of image quality). A variable-length coder ("VLC") 40 achieves further compression of an output stream by re-arranging the values in the quantized block and truncating extended runs of zeros. The VLC 40 provides a variable-length coded output to the buffer 38.

The above MPEG encoder 10 thus produces a compressed video output 42 from the video input 20. The output from the quantizer 34 is also fed back to achieve greater compression through differential imaging. The quantizer 34 output is provided to an inverse quantizer which de-quantizes each block. An inverse DCT unit 46 transforms each de-quantized block from the spatial-frequency domain back into the spatial domain to provide a reverse-transformed block. Any differential data from the motion compensation unit 30 is added to the reverse-transformed block in a second pixel-by-pixel summing junction 48, thereby generating a reconstructed block that is stored in a second frame memory 50. It is noted that each reconstructed block is identical to a corresponding block generated by an MPEG decoder that receives the compressed video output 42.

Each reconstructed block from the second frame memory 50 is compared to the sixteen-by-sixteen macroblocks of the next image in the first frame memory 24 in the motion estimation unit 28. The motion estimation unit 28 then generates motion vectors describing where in the next image any macroblocks from the previous image appear. The motion compensation unit 30 uses these motion vectors to generate differential image data. The motion vectors are also forwarded to the variable length coder 40 for transmission as a part of the compressed video output 42. An MPEG decoder receiving the motion vectors can use them, along with the differential image data, to reconstruct a complete image.

Figure 2:
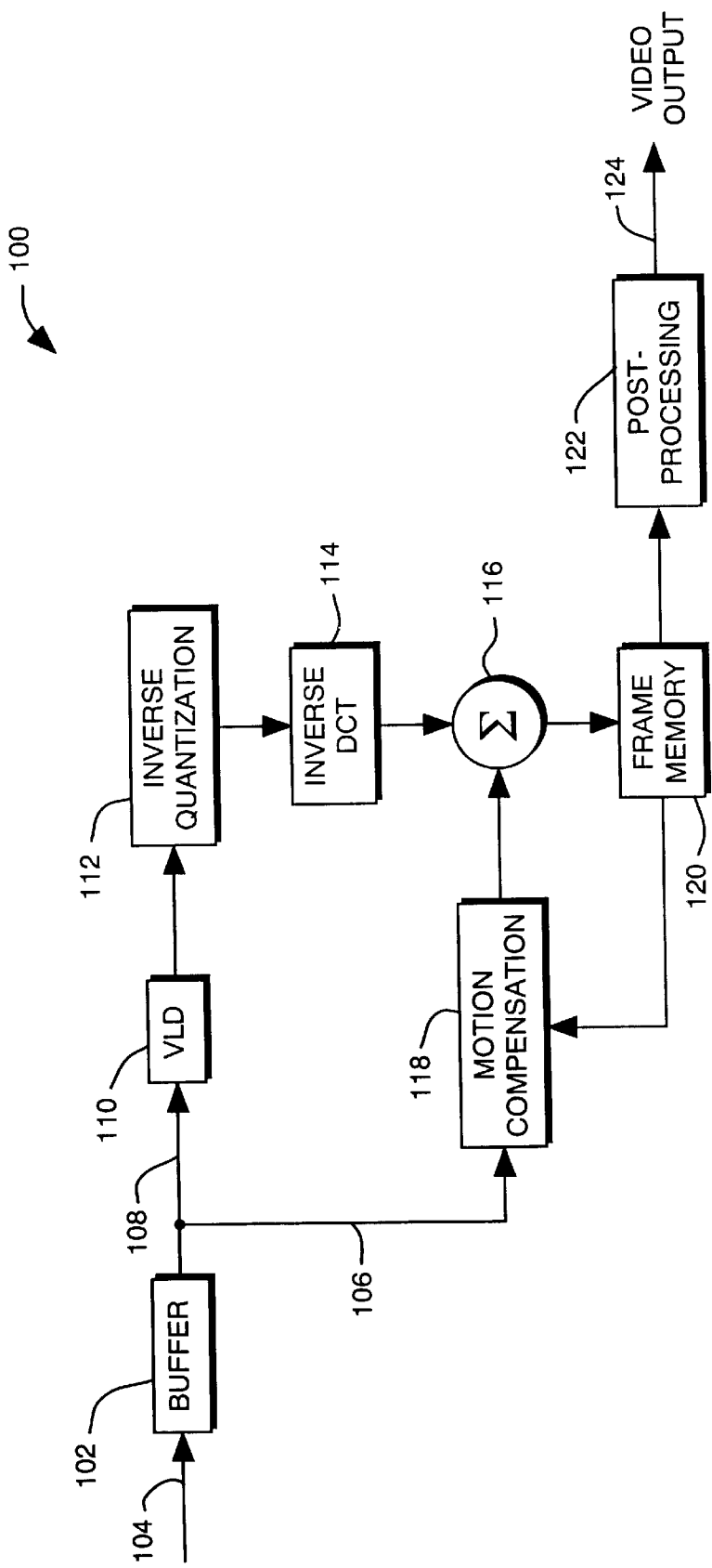
FIG. 2 is a block diagram of a prior art MPEG decoder.

FIG. 2 shows a prior art MPEG decoder 100 in block diagram form. The MPEG decoder 100 includes a buffer 102 to receive and buffer an incoming digital bit stream 104, including a compressed video stream such as the compressed video output 42 from the MPEG encoder 10 of FIG. 1. The buffer 102 divides the incoming digital bit stream 104 into motion vectors 106 and compressed frames 108 of image data. A variable-length decoder 110 decodes the compressed frames 108 into blocks. The blocks are provided to an inverse quantization unit 112 that re-scales the blocks using the same quantization index used by the quantizer 34 of FIG. 1. These re-scaled blocks are then provided to an inverse DCT unit 114 where an inverse DCT is performed on the re-scaled blocks to transform the spatial-frequency domain blocks back to the spatial domain, thereby providing spatial domain blocks.

The spatial domain blocks are then provided to a pixel-by-pixel summing junction 116 where motion compensation data from a motion compensation unit 118 is added to provide reconstructed blocks to a frame memory 120. The reconstructed blocks are then provided to a post-processing unit 122, where they are converted into a form for video output 124, which may be accomplished by a digital/analog converter for analog output. For some applications digital output is appropriate, such as a digital display, or a computer memory, disk drive, or other digital storage device. The frame memory 120 buffers consecutive reconstructed blocks. These buffered blocks are fed back to the motion compensation unit 118, where they are used in conjunction with the motion vectors 106 to generate differential image data. In the case of an I block, which encodes all image data, there is no differential image data.

It will be appreciated that a number of techniques are known for implementing the MPEG encoder 10 and the MPEG decoder 100 described above. All of the functions, except for analog/digital and digital/analog conversion of the video signal, may be accomplished with software executing on a microprocessor in a computer, or on a microcontroller or programmable digital signal processor in an embedded system. The system may be integrated in its entirety into an application-specific integrated circuit, programmable gate array, programmable logic device, or other system-on-a-chip design. Additionally, a number of video processing chips and chip sets are commercially available that are pre-configured to code and decode MPEG-2 media streams. Any of these devices may be adapted to operate according to the teachings of the invention.

Figure 3:
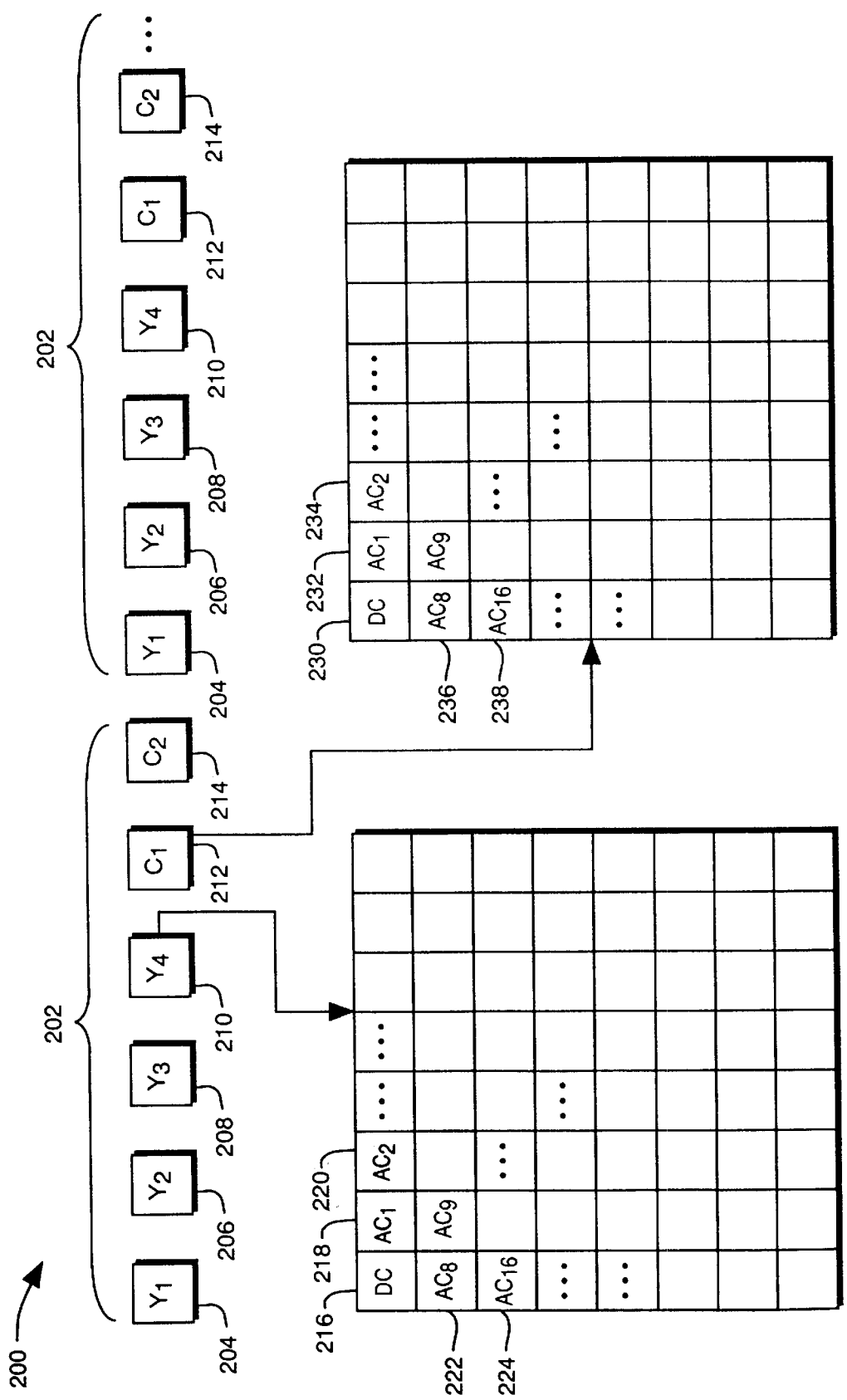
FIG. 3 is a diagram of data structures that may be included in an MPEG video stream.

FIG. 3 is a diagram of data structures that may be used in an MPEG video stream. A stream of data 200 leaves the quantizer 34 of the MPEG encoder 10. Each macroblock 202 of an original image has been converted into four Y blocks 204–210 and two C blocks 212–214 (the C blocks are also referred to as a $C_b$ block 212 and a $C_r$ block 214), which collectively represent a sixteen-by-sixteen pixel block of the original image. The macroblocks are pieced back together by the decoder 100 to form a reconstructed image. It will be appreciated that a complete MPEG stream also includes motion vectors, audio data, and other content interspersed as appropriate among consecutive macroblocks.

Each of the Y blocks 204–210 includes a DC coefficient 216 and a plurality of AC coefficients 218–224. Each of the C blocks is similarly arranged, and contains a DC coefficient 230 and a plurality of AC coefficients 232–238. The DC coefficients 216, 230 represent the lowest spatial frequency of the DCT, i.e., a zero-frequency component, while the AC coefficients 218–224, 232–238 represent progressively higher spatial frequency components as one progresses down and to the right in the Y or C blocks 204–214. In general, the lower, right portion of this representation includes many zeroes, which are efficiently compressed by variable-length coding.

In short, a watermark is inserted into these blocks 204–214 by setting a difference between corresponding coefficients of consecutive blocks to be even for one watermark bit and odd for another watermark bit. As an example, the difference may be forced even for a watermark bit of one, and odd for a watermark bit of zero. First, there is determined a difference between two corresponding coefficients in consecutive blocks, such as the DC coefficient 216 of the Y block 210 and the DC coefficient 230 of the C block 212. If this difference is even and the associated watermark bit is a one, then no change is necessary. However, if the watermark bit is a zero, then the DC coefficient 230 of the C block 212 is increased by one quantization level, or one binary step, so that the difference is odd. Decoding the watermark then becomes a simple task of comparing coefficients in consecutive macroblocks and assigning a one to each even difference and a zero to each odd difference. An embodiment of the watermarking process may be described by the following pseudo-code:

```
! next_bit is the next watermark bit
! n is the current block
! c is the coefficient number (0 = DC, 1 = AC1, ... )
! COEFF(c,n) is the cth coefficient of the nth block
! number_of_blocks is the number of blocks in the stream
for (n = 0; n < number_of_blocks; ++n)
    for (c = 0; 3)
    {
        x = next_bit
        if (x == 1)
        {
            if ((COEFF(c,n+1) - COEFF(c,n)) == even)
                COEFF(c,n+1) = COEFF(c,n+1);
            else if ((COEFF(c,n+1) - COEFF(c,n)) == odd)
                COEFF(c,n+1) = COEFF(c,n+1) + 1;
        }
        else if (x==0)
        {
            if ((COEFF(c,n+1) - COEFF(c,n)) == even)
                COEFF(c,n+1) = COEFF(c,n+1) + 1;
            else if ((COEFF(c,n+1) - COEFF(c,n)) == odd)
                COEFF(c,n+1) = COEFF(c,n+1);
        }
    }
```

It will be appreciated that, although FIG. 3 shows a Y block followed by a C block, a watermark bit may also be encoded between two consecutive Y blocks (e.g., blocks 204–206), two consecutive C blocks (e.g., 212–214), or a C block followed by a Y block. It will further be appreciated that different schemes may be usefully employed. For example, a watermark bit of one may be encoded into an odd difference and a watermark bit of zero may be encoded into an even difference. Also, although corresponding DC coefficients 216, 230 are described above, other corresponding coefficients from consecutive blocks may be used, such as a first AC coefficient 218 from the Y block 210 and a first AC coefficient 232 from the C block 212. This is shown in the above pseudo-code, which operates on the first four coefficients (0<=c<=3) of each block. In this manner, a number of watermark bits may be encoded between two consecutive blocks. Any such corresponding coefficients from consecutive blocks may be used, provided they have significant, non-zero values. When coefficients having near-zero values are used, such as typically found in higher spatial frequencies, visible watermarking artifacts may occur in reconstructed images. Also, using higher spatial frequency coefficients, which are often zero, may diminish the compression benefits of variable-length coding. It will additionally be appreciated that watermarking may be performed after application of the DCT and before quantization. However, since the quantization scale, or quantization levels, used for each coefficient are different, and may vary dynamically under control of the regulator 36, it is preferred to perform the watermarking after quantization.

Figure 4:
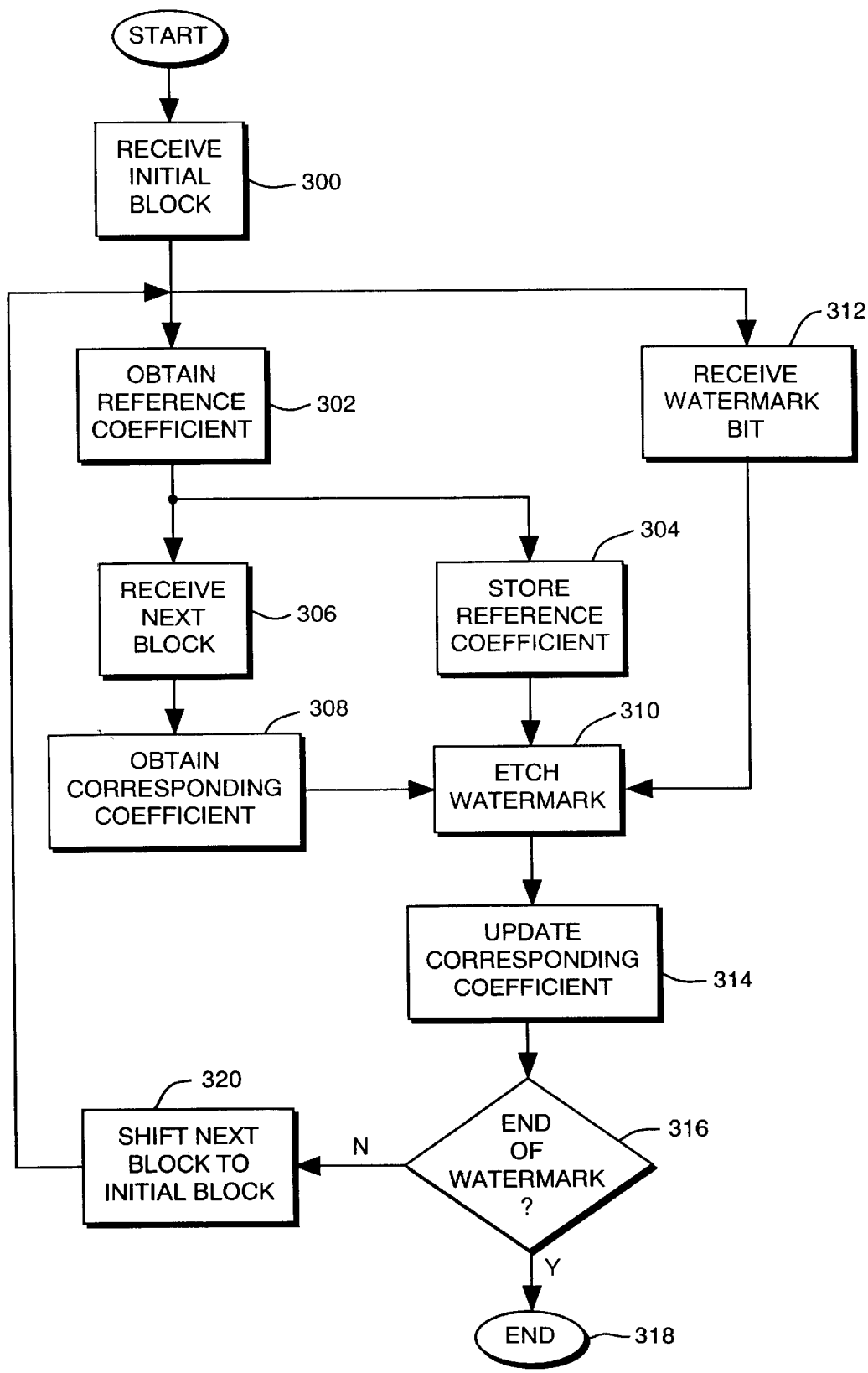
FIG. 4 is a flow chart describing an embodiment of a watermarking operation.

FIG. 4 is a flow chart describing an embodiment of a watermarking operation according to the system described herein. The operation starts with receiving an initial block of video data, as shown in step 300. The initial block is a transformed, spatial-frequency block, and preferably a quantized block. In step 302, a reference coefficient is obtained, which may be a DC or a low spatial frequency AC coefficient. The reference coefficient is stored 304, and a next block is received 306. A corresponding coefficient is obtained from the next block 308, which is a coefficient having the same spatial frequency as the reference coefficient. Prior to etching a watermark 310, a watermark bit is also received as in step 312 from a source independent of the source of blocks of video data.

In the watermark etching step 310, one of the watermark etching processes described above is applied. This may be, for example setting a difference between the reference coefficient and the corresponding coefficient to be even if the watermark bit is a one, and setting the difference to be odd if the watermark bit is a zero. In step 314, the corresponding coefficient in the next block is updated according to the watermark etching step 310. Then, as shown in step 316, if the end of the watermark has been reached, the watermark etching operation may be terminated 318. If the end of the watermark has not been reached, then the next block becomes a new initial block 320, with the updated corresponding coefficient becoming the new reference coefficient.

The steps detailed in FIG. 4 may be readily transformed into computer executable steps for use with a processor, or converted to other hardware, software, or mixed hardware/software signal processing forms for use in a digital video system. Reading a watermark bit etched with this process requires only obtaining a reference coefficient from an initial block, obtaining a corresponding coefficient from a next block, and determining whether the difference is odd or even.

Figure 5A:
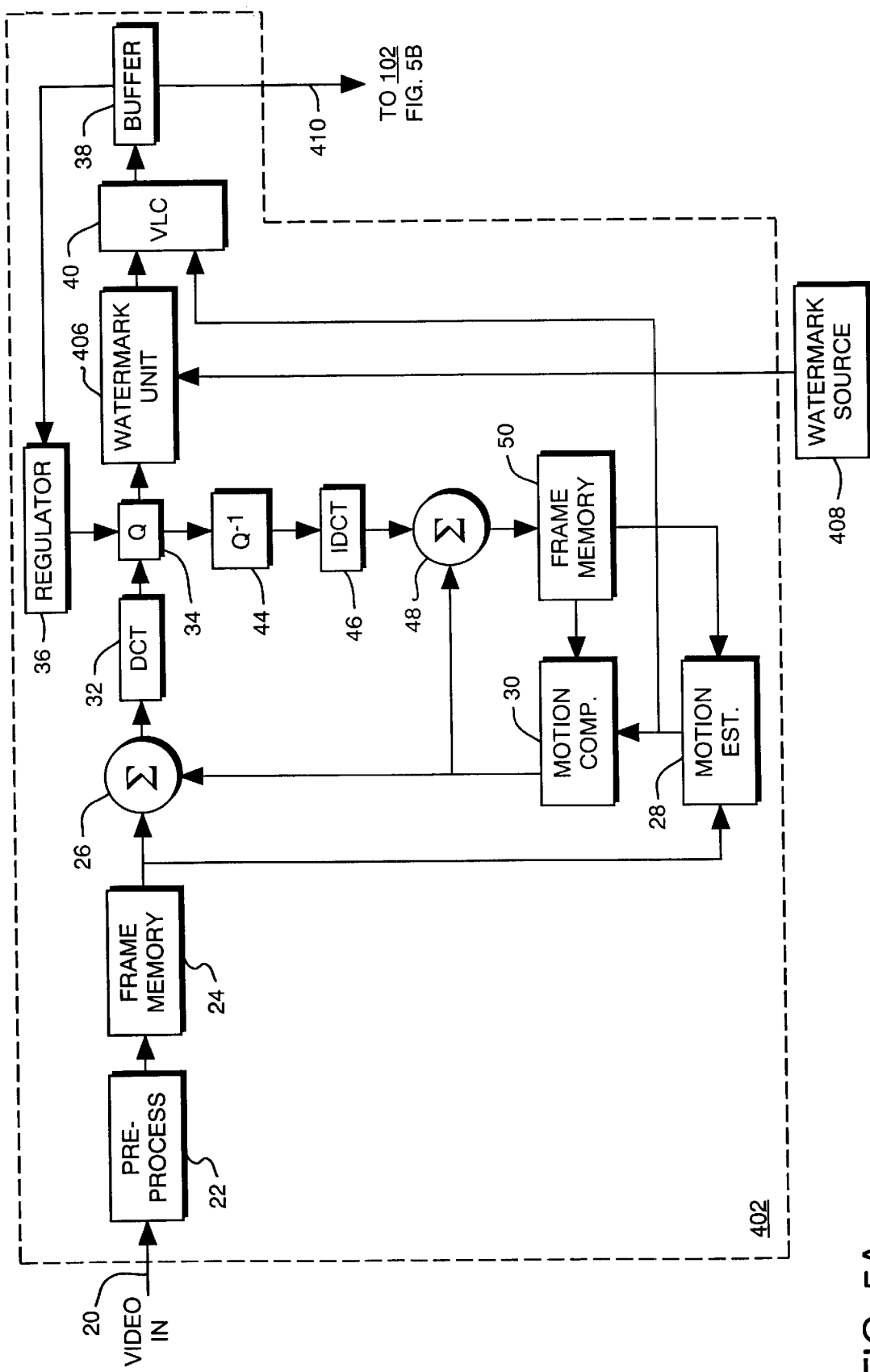
FIGS. 5A and 5B (hereinafter referred to as FIG. 5) are block diagrams of an embodiment of an MPEG encoder and an MPEG decoder using digital watermarking.
Figure 5B:
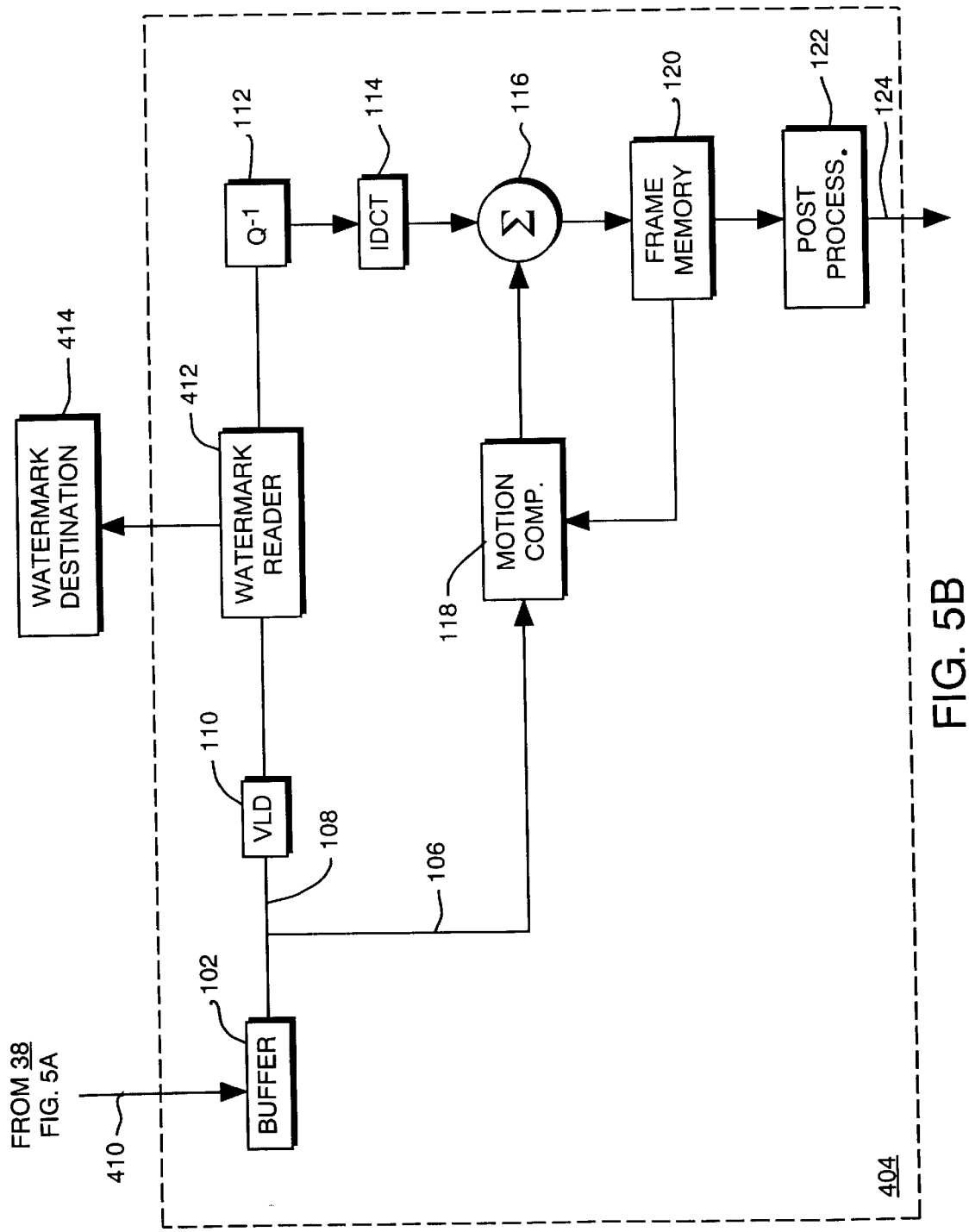

FIG. 5 is a block diagram of an embodiment of an MPEG encoder 402 and an MPEG decoder 404 using digital watermarking. The MPEG encoder 402 and the MPEG decoder 404 are similar to the MPEG encoder of FIG. 1 and the MPEG decoder of FIG. 2. Thus, the reference numbers used in FIG. 5 correspond in part with the reference numbers used in FIGS. 1 and 2, with differences as noted below. The MPEG encoder 402 includes a watermark unit 406 between the quantizer 34 and the VLC 40. The watermark unit 406 receives a digital watermark from a watermark source 408. The watermark source 408 may be any source of digital data, including a random access memory or a read-only memory, and the digital data comprising each watermark may include any encrypted or un-encrypted designation of origin, or other message content that is desired to be transmitted along with the MPEG video stream. The watermark unit 406 operates according to the watermarking systems described above and may use, for example, a micro-coded implementation of the above pseudo-code. Watermarked blocks are transmitted from the watermark unit 406 to the VLC 40 and buffer 38.

The MPEG video stream including the watermark is transmitted from the buffer 38 of the MPEG encoder 402 to the MPEG decoder 404 using a suitable communication link 410, and is received by the buffer 102 of the MPEG decoder 404. Each block of video data is forwarded to the variable-length decoder 110 where all of the zero coefficients are restored. A watermark reader 412 reads the watermark from the blocks using an operation corresponding to the operation used by the watermark unit 406. After reading, each block will still contain the watermark. The watermark can only be removed if it is known a priori at the watermark reader 412. The watermark is provided to a watermark destination 414, which can be, for example, a random access memory associated with the MPEG decoder 404.

Figure 6:
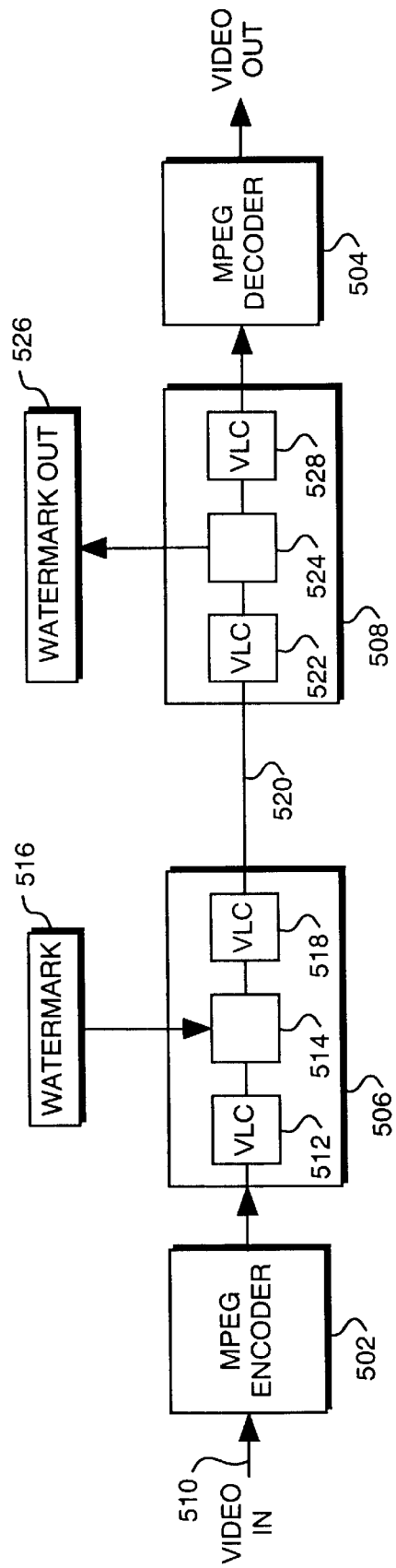
FIG. 6 is a block diagram of another embodiment of an MPEG encoder and MPEG decoder using digital watermarking.

FIG. 6 is a block diagram of another embodiment of an MPEG encoder 502 and an MPEG decoder 504 using digital watermarking. In this configuration, the MPEG encoder 502 and the MPEG decoder 504 are conventional MPEG components that are readily commercially available. A watermark etching device 506 and a watermark reading device 508 are connected thereto to provide external watermarking. The watermark etching device 506 is connected to the MPEG encoder 502 to receive an MPEG video stream encoded from a video source 510. The watermark etching device 506 includes a variable-length decoder 512 that reconstructs each block of video data. The variable-length decoder 512 transmits the blocks to a watermark unit 514 that operates in a manner similar to the watermark unit 406 of FIG. 5 to insert a watermark from a watermark source 516. Each watermarked block is then returned to an MPEG video stream format by variable-length encoding the blocks again in a VLC 518. The watermarked MPEG video stream is than transmitted over a suitable communication link 520.

The watermarked MPEG video stream is received by the watermark reading device 508 over the communication link 520. The watermark reading device 508 may be omitted, and the watermarked MPEG video stream may thus be decoded and viewed like a conventional MPEG video stream by the MPEG decoder 504. Alternatively, the MPEG decoder can include an integrated watermark reader such as that shown in FIG. 5. The watermark reading device 508 includes a variable-length decoder 522 that reconstructs each block of the MPEG video stream. A watermark reader 524 then reads a watermark from the blocks as described above, and transmits the watermark to a watermark destination 526, which may be, for example, a random access memory associated with the MPEG decoder 504 or the watermark reading device 508. After a watermark is read, each block is variable-length encoded again using a VLC 528 and transmitted to the MPEG decoder 504 for subsequent decoding of video content.

While the above description relates to a technique for etching a digital watermark into a digital multimedia stream, it does not describe what that digital watermark may be, i.e., what bit stream makes up the watermark. As will be explained below, a "histogram watermark" or "message authentication code" may be formed from a histogram analysis of data in each block. This message authentication code has the desirable property of describing the underlying digital content, which is useful, for example, in tamper-detection. It will be appreciated that the message authentication code described below may be practiced with the digital watermarking techniques described above, or with other watermarking techniques known in the art.

Figure 7:
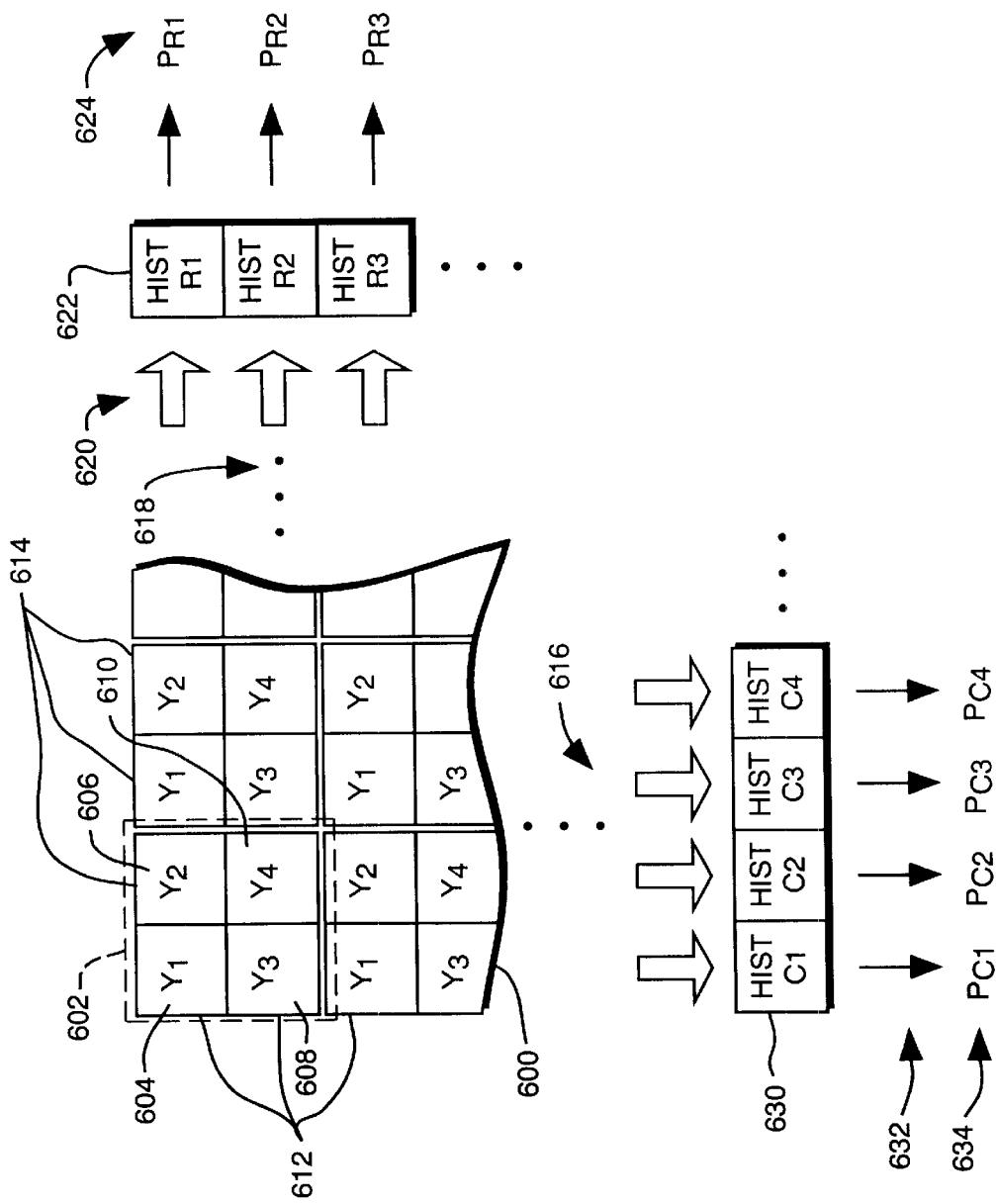
FIG. 7 shows an example of a relationship between digital content and parity bits of a histogram message authentication code.

FIG. 7 shows an example of a relationship between digital content and parity bits of a histogram message authentication code. Using the MPEG standard described above, an image 600 is formed from macroblocks 602, each macroblock 602 corresponding to a sixteen-by-sixteen block of image data. Each macroblock 602 includes four luminance blocks 604–610, labeled $Y_1$–$Y_4$, each luminance block including an eight-by-eight matrix of luminance values. These luminance blocks 604–610 contain the same data as the luminance blocks 204–210 of FIG. 3. A preferred embodiment of this watermark may not use the chrominance blocks of the MPEG stream. The luminance blocks 604–610 are arranged into rows 612 and columns 614, with each luminance block 604–610, corresponding to a particular one of the rows 612 and a particular one of the columns 614 of the image 600. Additional rows 612 and columns 614 may be added to describe larger images, as indicated by ellipses 616, 618. One common MPEG format, the main level at main profile, provides for 720×480 pixel frames at thirty frames-per-second. Each frame of this profile contains a matrix of macroblocks with forty-five columns and thirty rows, or to a matrix of corresponding luminance blocks with ninety columns and sixty rows.

In order to provide a compact representation of the image 600, an average value is obtained for each luminance block 604–610. This is obtained from the DC coefficient of each transformed luminance block, and has a value in a range from –1024 to 1023. Other values may be used, such as the gray-scale block average for each un-transformed macroblock, in which case the average will have a (gray-scale) range of 0 to 255. The DC coefficient is preferably used since it requires no additional calculations. For each row 612 of the image 600, a histogram of average values is obtained using bins that cover the range of possible average values. This operation is illustrated generally by arrows 620 and histograms 622. Each histogram 622 is converted to a single parity bit 624, with one parity bit 624 for each row 612 of the image 600. Similarly, for each column 614 of the image 600, a histogram of average values is obtained using bins that cover the range of possible average values. This operation is illustrated generally by arrows 630 and histograms 632. Each histogram 632 is converted to a single parity bit 634, with one parity bit 634 for each column 614 of the image 600.

The parity bits 622 from the rows 612 and the parity bits 632 from the columns 614 are then concatenated to form a message authentication code ("MAC") for the image 600. In an MPEG system, the MAC is preferably generated for each I frame of an MPEG video stream, and appended to, or etched into, a next chronological I frame of the MPEG video stream. In this arrangement, any change in the image 600 that is sufficiently large to move an average value for a block to a different bin of an associated histogram 622, 632 may also affect the parity bit 624, 634 for the associated row 612 and column 614. Thus, in addition to authenticating the MPEG stream, the MAC may provide specific information with respect to the location of any tampering.

Figure 8:
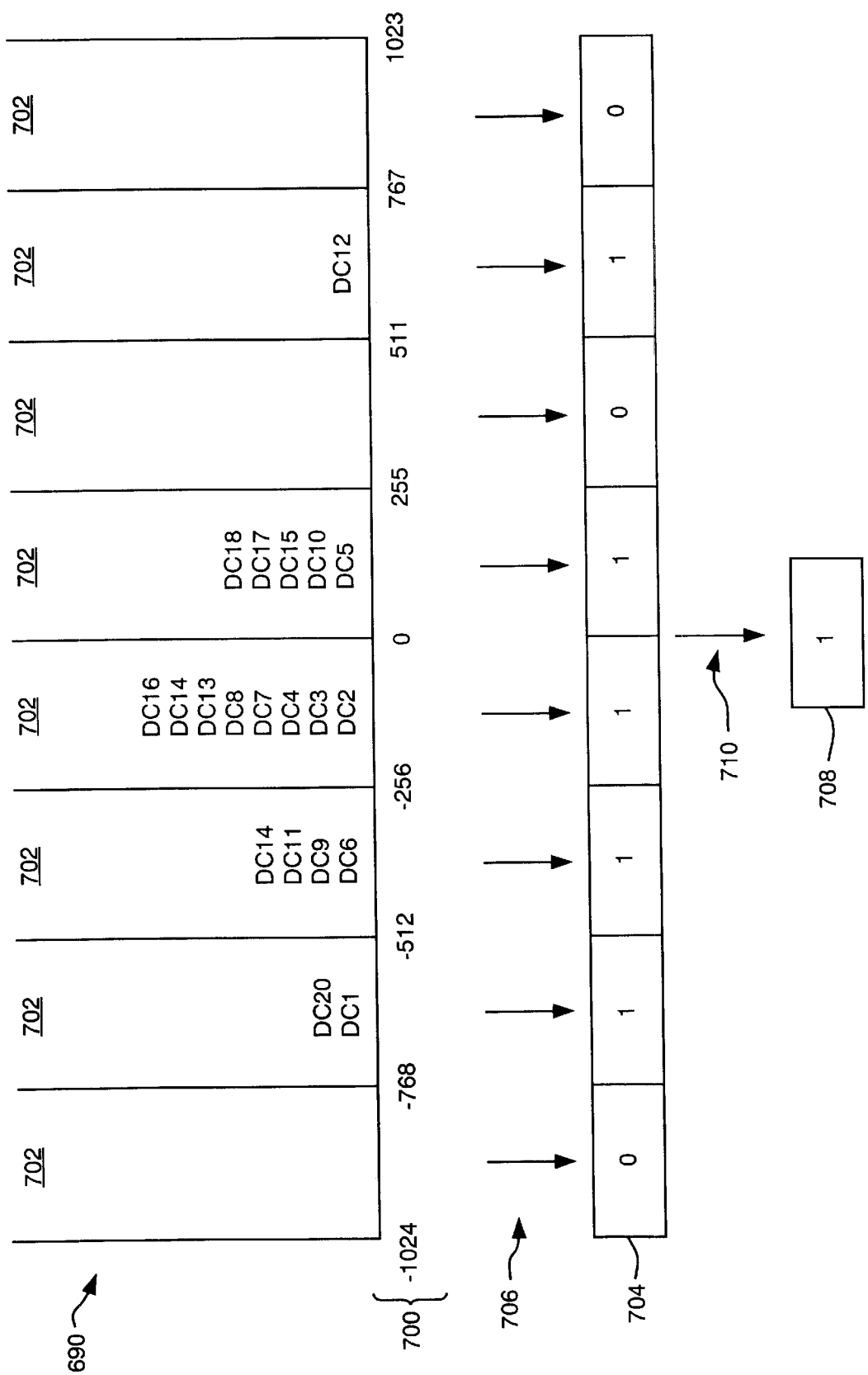
FIG. 8 shows an example of a histogram of DC coefficients used for a message authentication code.

FIG. 8 shows an example of a histogram of DC coefficients used for a message authentication code. The histogram operation and parity bit calculation noted above are described in more detail in connection with this figure. In a histogram 690, a range of possible values 700 is distributed among a plurality of contiguous bins 702. For DC coefficients of an MPEG stream, the bins 702 cover a range from −1024 to 1023, and the bins 702 are preferably eight, evenly space bins. It will be appreciated that other arrangements of bins and bin ranges are possible. In FIG. 8, twenty DC coefficients, designated DC1–DC20, are shown arranged in the bins according to their values. For example, DC1 might have a value of −602, which falls into the bin having a range from −768 to −512. Once the DC coefficients for a row or column have been arranged in a histogram in this fashion, a digital sequence 704 is generated for the histogram, with a one being assigned to each bin that contains any DC coefficients, and a zero being assigned to each bin that does not contain any DC coefficients. This operation is shown by arrows 706 from each bin 702 of the histogram to a corresponding bit of the digital sequence 704. For the histogram of FIG. 8, the digital sequence 704 would be "01111010."

A parity bit 708 is generated from the digital sequence 704. The parity bit 708 is a representation of the digital sequence 704 formed by summing the bits of the digital sequence 704, and by assigning a one or a zero to the parity bit 708 depending on whether the sum is odd or even. This operation is indicated generally by arrow 710. For the example histogram 690 of FIG. 8, the bits of the digital sequence sum to five, which is odd. Accordingly, a one is assigned to the parity bit 708. Once a parity bit 708 has been determined for each row 612 and each column 614, the parity bits 708 are concatenated to form a MAC. The 720×480 pixel image of the MPEG profile mentioned above corresponds to ninety columns and sixty rows of luminance blocks, or a 150 bit MAC. This MAC may be encrypted for further protection using any encryption scheme known in the art. The MAC may additionally include forward error correction or any other error correction code or scheme known in the art, which is particularly useful where a transmission medium does not provide independent error detection and/or correction.

It will be appreciated that variations to the above are possible. For example, not every bin of every histogram need necessarily be used, and not every row and column need necessarily be included in the MAC. Similarly, each row or column may be represented by a plurality of parity bits or other bits that described the coefficient histogram.

Figure 9A:
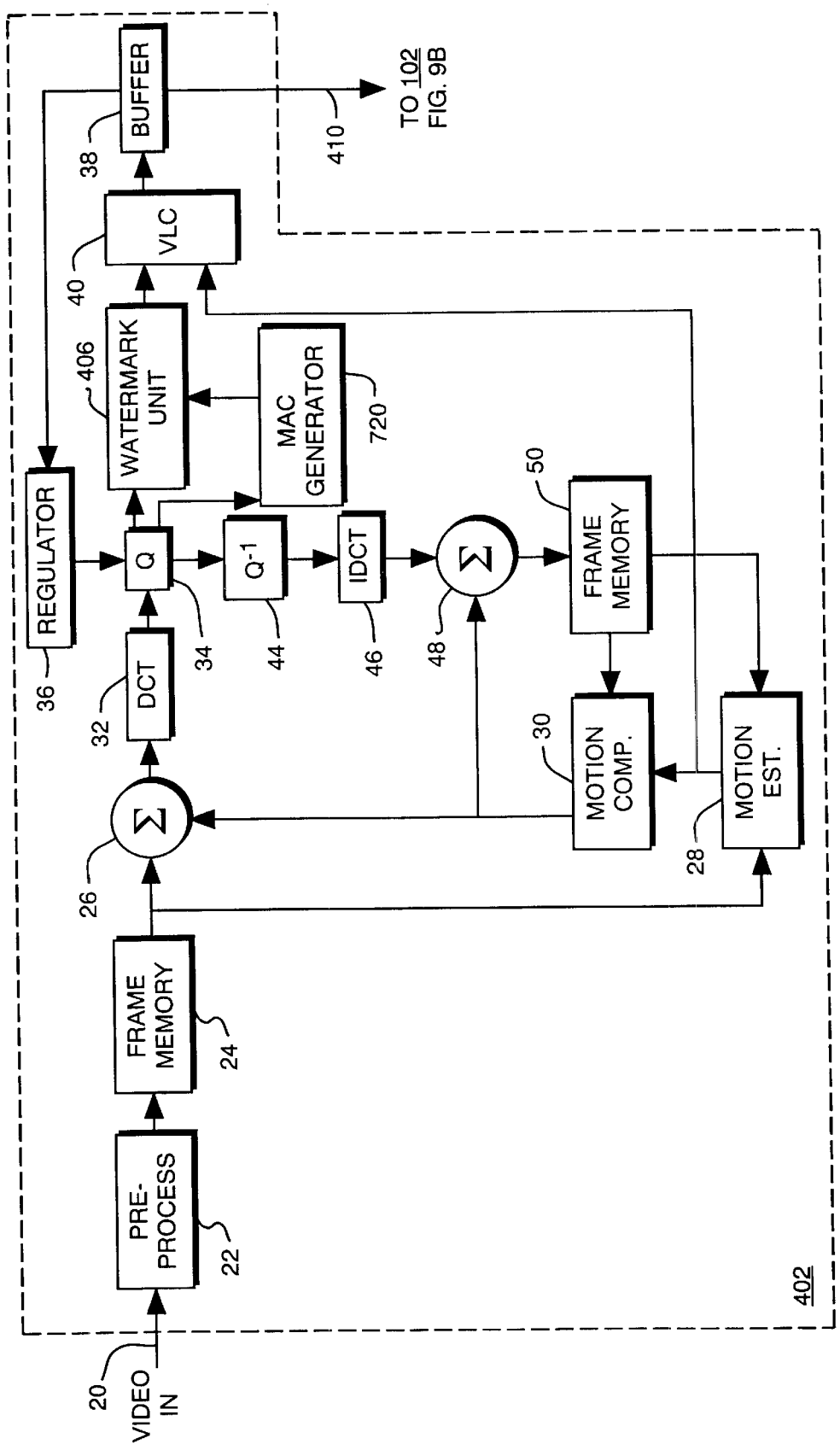
FIGS. 9A and 9B (hereinafter referred to as FIG. 9) are block diagrams of an embodiment of an MPEG encoder and MPEG decoder using a histogram message authentication code.
Figure 9B:
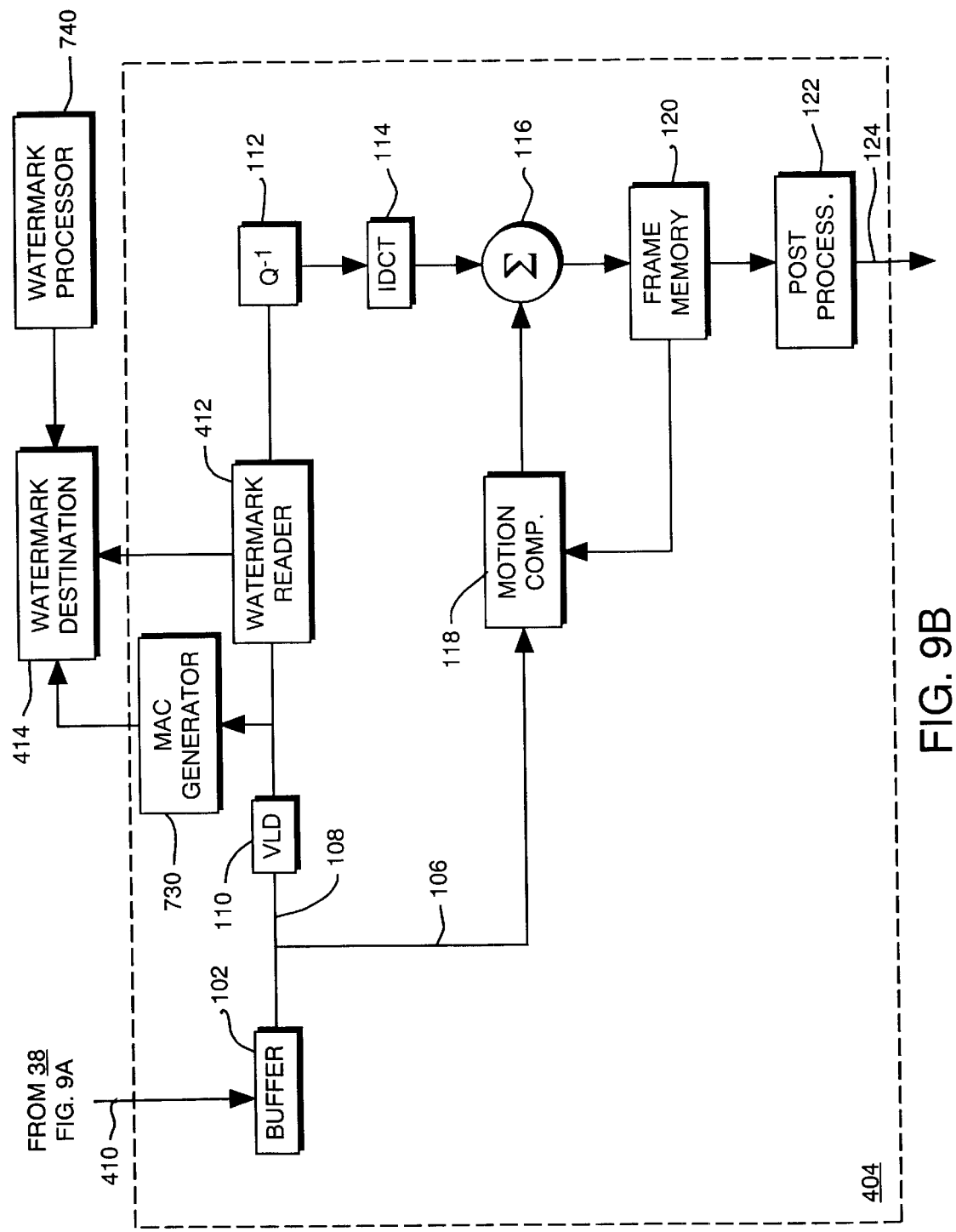

FIG. 9 is a block diagram of an embodiment of an MPEG encoder and MPEG decoder using a histogram message authentication code. It will be appreciated that the histogram watermark may be implemented using any of the techniques described above with respect to the MPEG encoder, MPEG decoder, and watermark unit described above in FIGS. 1, 2, 5, and 6. The MPEG encoder 402 and the MPEG decoder 404 are similar to the MPEG encoder and the MPEG decoder of FIG. 5. Thus, the reference numbers used in FIG. 9 correspond in part with the reference numbers used in FIG. 5, with differences as noted below.

The MPEG encoder 402 includes a first MAC generator 720. The first MAC generator receives quantized blocks from the quantizer 34 and generates a MAC using the histogram watermark technique described above. The MAC digital sequence is fed to the watermark unit 406 where it is etched into the MPEG video stream. The MPEG decoder 404 includes a corresponding MAC generator 730 that receives variable-length decoded (but still quantized) blocks from the variable-length decoder 110 and applies the same histogram watermark technique that was applied by the first MAC generator 720. This generates a MAC digital sequence from the image data in the MPEG video stream, and this MAC digital sequence is transmitted to the watermark destination 414. Additionally, the watermark reader 412 reads any embedded watermark etched into the MPEG video stream by the watermark unit 406 in the MPEG encoder 402 prior to transmission over the communication link 410. This embedded watermark is transmitted to the watermark destination 414, where it may be compared to the "expected" value derived from the image data by the MAC generator 730.

A watermark processor 740 examines the embedded watermark from the watermark reader 412 and the MAC digital sequence from the MAC generator 730. The watermark processor 740 may perform any analysis derived from this comparison. The location of errors in the MAC digital sequence will correspond to particular rows and columns of the MPEG video images. Thus the watermark processor 740 may localize errors to particular coordinates (i.e., a row and a column) and report or store this information. If the embedded watermark matches the MAC digital sequence, then the source of the MPEG video stream can be identified or confirmed by the watermark processor 740. If there is no match when one is expected, then the watermark processor 740 can determine that the MPEG video stream was tampered with during transmission. It will be appreciated that, in operation, this comparison need not yield an exact match between the watermark reader 412 results and the corresponding MAC generator 730 results. It is expected that some variations will appear due to, for example, bit errors in the communication link 410 or slight changes to DC coefficients that occur in the watermark unit 406 while a watermark is being etched.

Many variations to the system of FIG. 9 are possible. The first MAC generator 720 and the corresponding MAC generator 730 may be applied at different locations. For example, the first MAC generator 720 may operate on blocks prior to quantization by the quantizer 34, or prior to transformation by the DCT unit 32. In this case, the corresponding MAC generator 730 would receive blocks from a different location in the MPEG decoder 404, e.g., after the inverse quantization unit 112 or after the inverse DCT unit 114. Similarly, the first MAC generator 720 and the corresponding MAC generator 730 may be provided as stand-alone components to be used externally with off-the-shelf MPEG codecs. In this case, the first MAC generator 720 and the corresponding MAC generator 730 would include a variable-length decoder and a variable-length coder in order to maintain an MPEG-compliant data stream over the communication link 410.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A method of generating a message authentication code comprising:
   receiving a plurality of blocks of image data, each block corresponding to a particular one of a plurality of rows and a particular one of a plurality of columns of an image;
   generating a row histogram for each particular one of the plurality of rows, the row histogram representing values in blocks corresponding to the particular one of the plurality of rows;
   generating a row representation from each row histogram, the row representation corresponding to the particular one of the rows from which the row histogram was formed;

generating a column histogram for each particular one of the plurality of columns, the column histogram representing values in blocks corresponding to the particular one of the plurality of columns;

generating a column representation from each column histogram, the column representation corresponding to the particular one of the columns from which the column histogram was formed; and generating a message authentication code comprising the plurality of row representations and the plurality of column representations.

2. The method of claim 1 further comprising encrypting the message authentication code.

3. The method of claim 1 further comprising including an error correction code with the message authentication code.

4. The method of claim 1, wherein each row histogram represents a plurality of DC coefficient values in blocks corresponding to the particular one of the plurality of rows, and wherein each column histogram represents a plurality of DC coefficient values in blocks corresponding to the particular one of the plurality of columns.

5. The method of claim 1 wherein each row histogram represents a plurality of block average values in blocks corresponding to the particular one of the plurality of rows, and wherein each column histogram represents a plurality of block average values in blocks corresponding to the particular one of the plurality of columns.

6. The method of claim 1 wherein each row histogram comprises eight evenly spaced, contiguous bins, and wherein each column histogram comprises eight evenly spaced, contiguous bins.

7. The method of claim 1 wherein each row representation is a row parity bit and each column representation is a column parity bit.

8. The method of claim 7 wherein:

generating the row parity bit further comprises forming a row digital sequence from the row histogram, the row digital sequence including a row bin bit for each bin of the row histogram, and generating the row parity bit by summing the row bin bits of the digital sequence; and generating the column parity bit further comprises forming a column digital sequence from the column histogram, the column digital sequence including a column bin bit for each bin of the column histogram, and generating the column parity bit by summing the column bin bits of the column digital sequence.

9. The method of claim 7 wherein generating the message authentication code includes concatenating each of the row parity bits and each of the column parity bits.

10. The method of claim 1 wherein the message authentication code is a one-hundred fifty bit message authentication code.

11. The method of claim 1 wherein the plurality of blocks of image data comprise a Moving Picture Experts Group video stream.

12. A method of using a message authentication code comprising:

receiving a plurality of blocks of image data, each block corresponding to a particular one of a plurality of rows and a particular one of a plurality of columns of an image;

generating a row histogram for each particular one of the plurality of rows, the row histogram representing values in blocks corresponding to the particular one of the plurality of rows;

generating a row representation from each row histogram, the row representation corresponding to the particular one of the rows from which the row histogram was formed;

generating a column histogram for each particular one of the plurality of columns, the column histogram representing values in blocks corresponding to the particular one of the plurality of columns;

generating a column representation from each column histogram, the column representation corresponding to the particular one of the columns from which the column histogram was formed;

generating a message authentication code comprising the plurality of row representations and the plurality of column representations;

reading a watermark from the plurality of blocks of image data; and comparing the watermark to the message authentication code.

13. The method of claim 12 further comprising decrypting the watermark before comparing it to the message authentication code.

14. The method of claim 12, wherein each row histogram represents a plurality of DC coefficient values in blocks corresponding to the particular one of the plurality of rows, and wherein each column histogram represents a plurality of DC coefficient values in blocks corresponding to the particular one of the plurality of columns.

15. The method of claim 12 wherein each row histogram represents a plurality of block average values in blocks corresponding to the particular one of the plurality of rows, and wherein each column histogram represents a plurality of block average values in blocks corresponding to the particular one of the plurality of columns.

16. The method of claim 12 wherein each row histogram comprises eight evenly spaced, contiguous bins, and wherein each column histogram comprises eight evenly spaced, contiguous bins.

17. The method of claim 12 wherein each row representation is a row parity bit and each column representation is a column parity bit.

18. The method of claim 17 wherein:

generating the row parity bit further comprises forming a row digital sequence from the row histogram, the row digital sequence including a row bin bit for each bin of the row histogram, and generating the row parity bit by summing the row bin bits of the digital sequence; and generating the column parity bit further comprises forming a column digital sequence from the column histogram, the column digital sequence including a column bin bit for each bin of the column histogram, and generating the column parity bit by summing the column bin bits of the column digital sequence.

19. The method of claim 17 wherein generating the message authentication code includes concatenating each of the row parity bits and each of the column parity bits.

20. The method of claim 12 wherein the message authentication code comprises a one-hundred fifty bit message authentication code.

21. The method of claim 12 wherein the plurality of blocks of image data comprise a Moving Picture Experts Group video stream.

22. The method of claim 12 wherein comparing the watermark to the message authentication code further comprises localizing errors in the plurality of blocks of image data.

23. A system for generating a message authentication code comprising:

means for receiving a plurality of blocks of image data, each block corresponding to a particular one of a plurality of rows and a particular one of a plurality of columns of an image;

means for generating a row histogram for each particular one of the plurality of rows, the row histogram representing values in blocks corresponding to the particular one of the plurality of rows;

means for generating a row representation from each row histogram, the row representation corresponding to the particular one of the rows from which the row histogram was formed;

means for generating a column histogram for each particular one of the plurality of columns, the column histogram representing values in blocks corresponding to the particular one of the plurality of columns;

means for generating a column representation from each column histogram, the column representation corresponding to the particular one of the columns from which the column histogram was formed; and means for generating a message authentication code comprising the plurality of row representations and the plurality of column representations.

24. The system of claim 23 wherein each row representation is a row parity bit and each column representation is a column parity bit.

25. The system of claim 23 further comprising means for encrypting the message authentication code.

26. The system of claim 23 further comprising means for including error correction with the message authentication code.

27. The system of claim 26, further comprising:

a Moving Picture Experts Group encoder for providing the plurality of blocks of image data to the receiving means; and a watermark unit for embedding the message authentication code in the plurality of blocks of image data.

28. The system of claim 26 further comprising:

a Moving Picture Experts Group decoder for providing the plurality of blocks of image data to the receiving means;

a watermark reader for reading a watermark embedded in the plurality of blocks of image data; and a watermark processor for comparing the watermark to the message authentication code.

29. A digital video encoder comprising:

a transform unit, the transform unit receiving a plurality of blocks of video data and performing a two-dimensional transform on each block to provide a transformed block, each transformed block including a plurality of coefficients;

a quantizer, the quantizer receiving each transformed block and scaling each coefficient of each transformed block using a quantization index, thereby providing a plurality of quantized blocks;

a message authentication code generator, the message authentication code generator receiving each of the plurality of quantized blocks and generating a message authentication code, the message authentication code including a plurality of row parity bits and a plurality of column parity bits, each one of the plurality of row parity bits determined according to a parity of a sum of corresponding row histogram bins containing DC coefficients, and each one of the column parity bits determined according to a parity of a sum of corresponding column histogram bins containing DC coefficients; and a watermark unit, the watermark unit receiving the message authentication code and the plurality of quantized blocks, and the watermark unit embedding the message authentication code into the plurality of quantized blocks.

30. The digital video encoder of claim 29 wherein the message authentication code generator encrypts the message authentication code.

31. The digital video encoder of claim 29 wherein each row histogram comprises eight evenly spaced, contiguous bins, and wherein each column histogram comprises eight evenly spaced, contiguous bins.

32. The digital video encoder of claim 29 wherein the message authentication code comprises a concatenation of each of the plurality of row parity bits and each of the plurality of column parity bits.

33. The digital video encoder of claim 29 wherein the message authentication code is a one-hundred fifty bit message authentication code.

34. The digital video encoder of claim 29 wherein the plurality of blocks of video data comprise a Moving Picture Experts Group video stream.

35. A message authentication code embodied in a Moving Picture Experts Group video data carrier signal, the message authentication code comprising:

a plurality of row parity bits, one row parity bit for each row of transformed blocks of an image, each one of the row parity bits determined according to a parity of a sum of corresponding row histogram bins containing DC coefficients; and a plurality of column parity bits, one column parity bit for each column of transformed blocks of the image, each one of the column parity bits determined according to a parity of a sum of corresponding column histogram bins containing DC coefficients.

36. The message authentication code of claim 35 wherein the plurality of row parity bits comprises sixty row parity bits and the plurality of column parity bits comprises ninety column parity bits.

37. The message authentication code of claim 35 wherein the plurality of column parity bits and the plurality of row parity bits are encrypted.

38. A computer program product for generating a message authentication code, embodied in machine executable code for performing the following steps:

receiving a plurality of blocks of image data, each block corresponding to a particular one of a plurality of rows and a particular one of a plurality of columns of an image;

generating a row histogram for each particular one of the plurality of rows, the row histogram representing values in blocks corresponding to the particular one of the plurality of rows;

generating a row representation from each row histogram, the row representation corresponding to the particular one of the rows from which the row histogram was formed;

generating a column histogram for each particular one of the plurality of columns, the column histogram representing values in blocks corresponding to the particular one of the plurality of columns;

generating a column representation from each column histogram, the column representation corresponding to the particular one of the columns from which the column histogram was formed; and generating a message authentication code comprising the plurality of row representations and the plurality of column representations.

39. The computer program product of claim 38 further comprising machine executable code for encrypting the message authentication code.

40. The computer program product of claim 38 wherein each row histogram represents a plurality of DC coefficient values in blocks corresponding to the particular one of the plurality of rows, and wherein each column histogram represents a plurality of DC coefficient values in blocks corresponding to the particular one of the plurality of columns.

41. The computer program product of claim 38 wherein each row histogram represents a plurality of block average values in blocks corresponding to the particular one of the plurality of rows, and wherein each column histogram represents a plurality of block average values in blocks corresponding to the particular one of the plurality of columns.

42. The computer program product of claim 38 wherein each row histogram comprises eight evenly spaced, contiguous bins, and wherein each column histogram comprises eight evenly spaced, contiguous bins.

43. The computer program product of claim 38 wherein:

generating the row representation further comprises forming a row digital sequence from the row histogram, the row digital sequence including a row bin bit for each bin of the row histogram, and generating a row parity bit by summing the row bin bits of the digital sequence; and generating the column representation further comprises forming a column digital sequence from the column histogram, the column digital sequence including a column bin bit for each bin of the column histogram, and generating a column parity bit by summing the column bin bits of the column digital sequence.

44. The computer program product of claim 38 wherein generating the message authentication code includes concatenating each of the row representations and each of the column representations.

45. The computer program product of claim 38 wherein the message authentication code is a one-hundred fifty-bit message authentication code.

46. The computer program product of claim 38 wherein the plurality of blocks of image data comprise a Moving Picture Experts Group video stream.

* * * * *